(12) United States Patent
Brown et al.

(10) Patent No.: US 9,946,101 B2
(45) Date of Patent: Apr. 17, 2018

(54) GATE DRIVER CONTROL CIRCUIT

(71) Applicant: Apple Inc., Cupertino, CA (US)

(72) Inventors: James E. C. Brown, San Jose, CA (US); Fenghua Zheng, Cupertino, CA (US); Sandro H. Pintz, Menlo Park, CA (US)

(73) Assignee: APPLE INC., Cupertino, FL (US)

( * ) Notice: Subject to any disclaimer, the term of this patent is extended or adjusted under 35 U.S.C. 154(b) by 288 days.

(21) Appl. No.: 14/835,366

(22) Filed: Aug. 25, 2015

(65) Prior Publication Data

US 2016/0267865 A1 Sep. 15, 2016

Related U.S. Application Data

(60) Provisional application No. 62/133,153, filed on Mar. 13, 2015.

(51) Int. Cl.
*G09G 3/36* (2006.01)
*G02F 1/133* (2006.01)

(52) U.S. Cl.
CPC ....... *G02F 1/13306* (2013.01); *G09G 3/3677* (2013.01); *G09G 2310/0286* (2013.01); *G09G 2310/0289* (2013.01)

(58) Field of Classification Search
CPC ......... G09G 3/3677; G09G 2310/0286; G09G 2310/0289; G02F 1/133069
See application file for complete search history.

(56) References Cited

U.S. PATENT DOCUMENTS

| | | | |
|---|---|---|---|
| 8,803,783 B2 | 8/2014 | Ochiai et al. | |
| 2001/0033254 A1* | 10/2001 | Furusato | G06F 3/0414 345/55 |
| 2003/0089916 A1* | 5/2003 | Matsumoto | G09G 3/20 257/88 |
| 2006/0038756 A1* | 2/2006 | Bae | G09G 3/3216 345/76 |
| 2014/0104256 A1 | 4/2014 | Oohira | |
| 2015/0138249 A1 | 5/2015 | Miyata et al. | |

* cited by examiner

*Primary Examiner* — Latanya Bibbins
(74) *Attorney, Agent, or Firm* — Womble Bond Dickinson (US) LLP

(57) ABSTRACT

A method for operating a gate driver that is driving pixel transistors of a display panel, is described. An internal start pulse is produced in response to an external start pulse and in accordance with a system clock, wherein the internal start pulse is input to a first cell of a gate driver shift register whose outputs are coupled to level shifting output stages that are driving the rows of pixel transistors of the display panel. The produced internal start pulse was qualified by an output of a last cell of the gate driver shift register. Other embodiments are also described and claimed.

15 Claims, 5 Drawing Sheets

GATE DRIVER CONTROL CIRCUIT

This non-provisional application claims benefit of the earlier filing date of U.S. Provisional Application Ser. No. 62/133,153, filed Mar. 13, 2015.

An embodiment of the invention relates to circuitry for driving the gate lines of a display element array, such as an active matrix liquid crystal display (LCD) panel. Other embodiments are also described.

BACKGROUND

For many applications, and particularly in consumer electronic devices, the large and heavy cathode ray tube (CRT) has been replaced by flat panel display types such as liquid crystal display (LCD), plasma, and organic light emitting diode (OLED). A flat panel display contains an array of display elements. Each display element is to receive a signal that represents the picture element (pixel) value to be displayed at that location. In an active matrix array, the pixel signal is applied using a pixel transistor that is coupled to and integrated with the display element. The pixel transistor acts as a switch element. It has a carrier electrode that receives the pixel signal and a control electrode that receives a gate (select) signal. The gate signal may serve to turn on or turn off the transistor so as to selectively apply or "sample" the pixel signal onto the coupled display element. In many instance, the pixel transistor is formed as a thin film transistor (TFT) on the display panel as its substrate.

Typically, thousands or millions of copies of the display element and its associated switch element (e.g., an LCD cell and its associated field effect transistor, FET) are reproduced in the form of an array, on a substrate such as a plane of glass (in the case of an LCD panel) or other suitable substrate for the display elements. The array is overlaid with a grid of data lines and gate lines. The data lines serve to deliver the pixel signals to the carrier electrodes of the transistors and the gate lines serve to apply the gate signals to the control electrodes of the transistors. In other words, each of the data lines is coupled to a respective group of display elements, typically referred to as a column of display elements, while each of the gate lines is coupled to a respective row of display elements.

Each data line is coupled to a data line driver circuit that receives control and pixel signals from a signal generator. The latter translates incoming pixel values (for example, red, green and blue pixel values) into data signals (with appropriate timing). The data line driver then performs the needed voltage level shifting to produce a pixel signal with the needed fan-out (current capability).

As to the gate lines, these are coupled to a gate driver that receives clock (control) signals and a start pulse signal from the signal generator. The clock control and start pulse signals may be generated by display driver circuitry, based on horizontal and vertical sync signals that help define the scan of each frame to be displayed. The array of display elements are, in most cases, driven in a horizontal or line-by-line scanning fashion: the desired pixel signals for a selected line or row of display elements are provided on the data lines, and the pixel signals are then "written" into a selected row of display elements when a pulse is asserted on the gate line that is connected to the pixel transistors of the selected row, by the gate driver. The approach is to scan line-by-line or row-by-row in a vertical direction, until the entire display element array has been "filled" with the pixel values of a single image frame. For this purpose, the gate driver is designed to act as a shift register so that each time a start pulse is received by the gate driver, a shift register circuit starts and propagates an output pulse. The outputs of the shift register circuit are connected to level shifting output stages, which in turn are connected to the gate lines. Thus, the gate driver sequentially drives the pixel transistors on each gate line (with the needed fan out and voltage swing).

SUMMARY

It is desirable to protect against the case where the gate driver turns on more than a maximum number of rows of pixel transistors simultaneously. This maximum could be exceeded if there is noise or a display driver programming error that causes untimely start pulses to be fed to a conventional gate driver, because the latter (acting as a shift register) propagates a new start pulse onto the gate lines in response to every assertion of its start pulse input.

An embodiment of the invention is a circuit that protects a gate driver, that uses shift register logic, from being susceptible to noise on an external start pulse input, and also to other events that might trigger an untimely pulse at the external start pulse input. A state machine waits until an external start pulse has propagated through the last stage of the gate driver circuit's shift register logic (or, said differently, the shift register logic has completed one cycle), before allowing a new pulse at the external start pulse input to be accepted (for propagation through the shift register logic). In addition to enabling a more accurate display of each frame, this scheme may also protect the display panel (and its associated circuitry) as a whole, against damage due to the turning on of too many rows of pixel transistors simultaneously.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever aspects of the embodiments described here are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
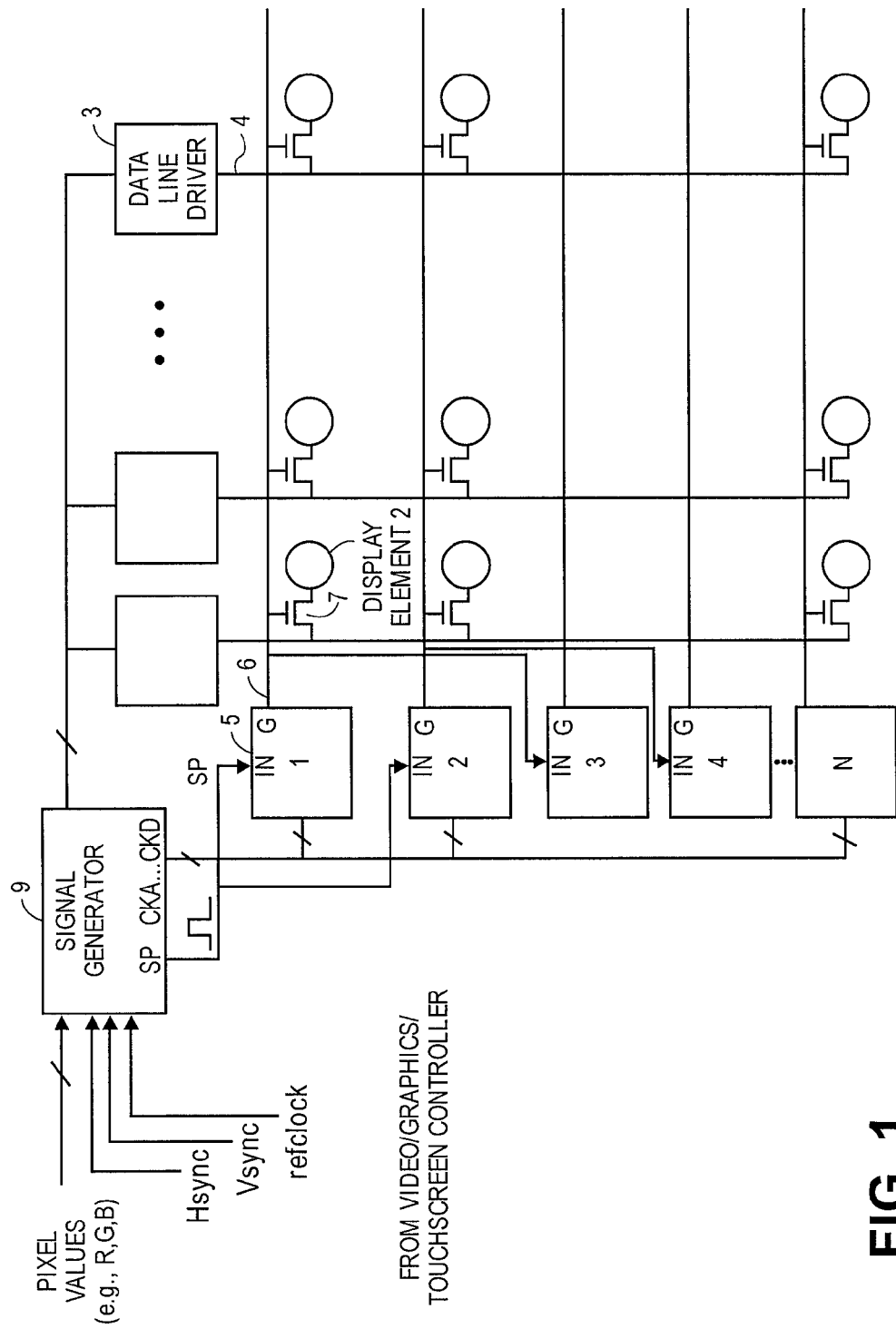
FIG. 1 is a combined block diagram and circuit schematic of an example display element array system.

FIG. 1 is a combined block diagram and circuit schematic of an example display element array system, in which an embodiment of the invention may be implemented. The system has an array of display elements 2. Each display element 2 may be an LCD cell, an OLED cell, or other suitable type of display cell that serves to display a digital pixel value at a given position of a display panel. A switch element 7 is coupled to each display element. The switch element 7 may be a field effect transistor (FET) as shown, having a gate electrode and upper and lower carrier electrodes (e.g., drain and source electrodes). In this example, the switch element 7 may be a single MOS TFT device (pixel TFT) that is formed on the same substrate as the display element 2. A source of the switch element 7 is coupled to a cell electrode of the display element while its drain is coupled to a data line 4. Each data line 4 is coupled in the same manner to a group of such switch elements 7, in this case forming a column. There are several of such columns as shown. The control electrode (e.g., gate) of the switch element 7 is coupled to a gate line 6. The gate line 6 serves to deliver a display element select or control signal to any one of a group of coupled switch elements 7. Each gate line 6 is coupled in the same manner to a respective group of switch elements 7, in this case forming a row. There are N such rows as shown. With suitable signals being applied to the gate lines and data lines, full control of the color and/or light output characteristics of each cell can be achieved.

The system also has a gate driver that generates, and is coupled to apply, an output pulse G(i) to each of the N gate lines 6. There is a separate gate line driver 5 coupled to drive a respective one of the gate lines 6 as shown. In this example, each gate line driver 5 contains both shift register logic and a level shifting output stage, which may use any of the available clock signals CKA, CKB, CKC, and CKD that are produced by a signal generator 9. A clock signal is a precision generated digital periodic signal, e.g. binary, 50% duty cycle or square wave, whose transitions may be precisely controlled to be in synch with a reference clock (e.g., ref clock, or a system clock). In one embodiment, each of the clock signals has 50% duty cycle, and their half-period is equal to about twice the duration of a horizontal sync interval H. Other ways of defining the clock signals that are input to the gate line drivers 5 are possible.

Each of the gate line drivers 5 contains shift register logic having a Carrier-In input (In). For a gate line driver 5 that is driving the pixel transistors of a row that is at or near an edge of the display element array, the Carrier-In input may receive a start pulse, SP. To complete the shift register logic for the rest of the gate line drivers 5, the Carrier-In of the third and any subsequent gate line driver 5 is fed by an output pulse G of two rows prior, i.e. G(3) is responsive to G(1) at Carrier-In, G(4) is responsive to G(2) at Carrier-In, G(5) is responsive to G(3), etc. Other ways of implementing the shift register logic are possible including feeding an internal logic level signal of a gate line driver, rather than its G(i) output, to a subsequent stage of the shifter register logic. The shift register logic is triggered by the assertion of the SP at the data input of the first shift register stage (also referred to firstX), and the SP is then sequentially propagated (as level shifted into an output pulse G(i)) to each successive gate line 6.

The clock signals and start pulse, SP, are produced by a signal generator 9 in response to translating or decoding conventional Hsync and Vsync video display timing signals together with a data enable signal (not shown) that may be received from a video/graphics/touchscreen, vgt, controller (not shown). The signal generator 9 also decodes the incoming pixel values from the vgt controller, into their corresponding voltage or current signals (data signals) for the data line drivers 3, which in turn create the pixel signals to be applied to each display element 2 by its associated switch element 7. The signal generator 9 may use a reference clock (refclock) that may be provided by the vgt controller, to precisely control the timing or signal transitions of the clocks CKA . . . CKD and SP that it produces.

Figure 2:
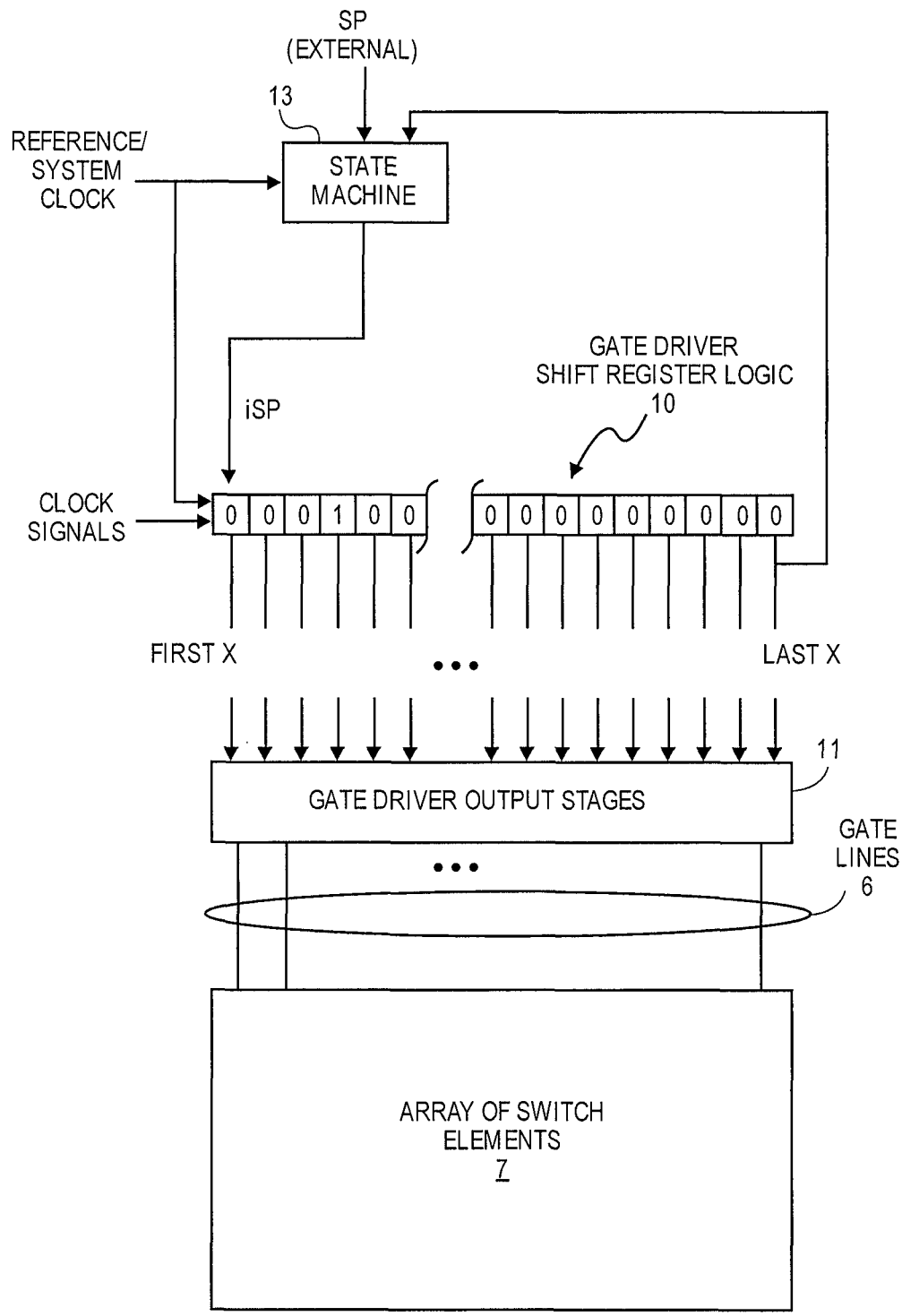
FIG. 2 is a schematic of a gate driver whose shift register logic has a controlled, internal start pulse input.

As explained above, the arrangement in FIG. 1 is susceptible to noise or programming errors that result in untimely assertions of the SP from the signal generator 9, which causes the gate driver as a whole to turn on too many rows of pixel transistors simultaneously. FIG. 2 is a schematic of a gate driver whose shift register logic has an advantageously controlled internal start pulse, iSP, input. The gate driver has gate driver output stages 11 which perform level shifting and provide fanout, while connected to drive rows of switch elements 7 (pixel transistors) in the array, through their respective gate lines 6. Inputs to the output stages 11 are from the outputs of shift register logic 10, one for each row. A pulse appearing at the carrier-in node of the "first" cell of the shift register logic 10 is asserted as a pulse at the output of the first cell, FirstX. The pulse then propagates according to a system clock, sequentially along the cells of the shift register logic until it appears at the output of the "last" cell, LastX. FIG. 2 shows the condition of the shift register logic 10 as a pulse (represented as a "1" in the fourth cell) is propagating through it. References to "first" and "last" here are referring to the relevant starting cell and ending cell, respectively, of a shift register that drives the associated gate lines which are at or near a boundary of an array of pixel transistors (in the display panel). For example, in FIG. 1, the first cell may be the shift register cell that is part of the gate line driver 5 which is at position 2, rather than the one at position 1, while the last cell may be the shift register cell that is part of the gate line driver 5 which is at position N.

The gate driver also has state machine logic 13 which controls the iSP input of the shift register logic 10, by waiting until an external start pulse (SP) has propagated through the last stage of the shift register logic 10 (or, said differently, the shift register logic 10 has completed one cycle), before allowing a new pulse at its external SP input to be accepted (into a new pulse at the iSP input of the shift register logic 10).

Said differently, the state machine logic 13 receives an external start pulse (SP) and produces an internal start pulse (iSP), responsive to SP and in accordance with a system clock, wherein the iSP is input to a first cell of a gate driver shift register whose outputs are coupled to level shifting output stages that are driving a number of rows of pixel transistors of a display panel, and wherein the produced iSP was qualified by an output of a last cell of the gate driver shift register.

Figure 3:
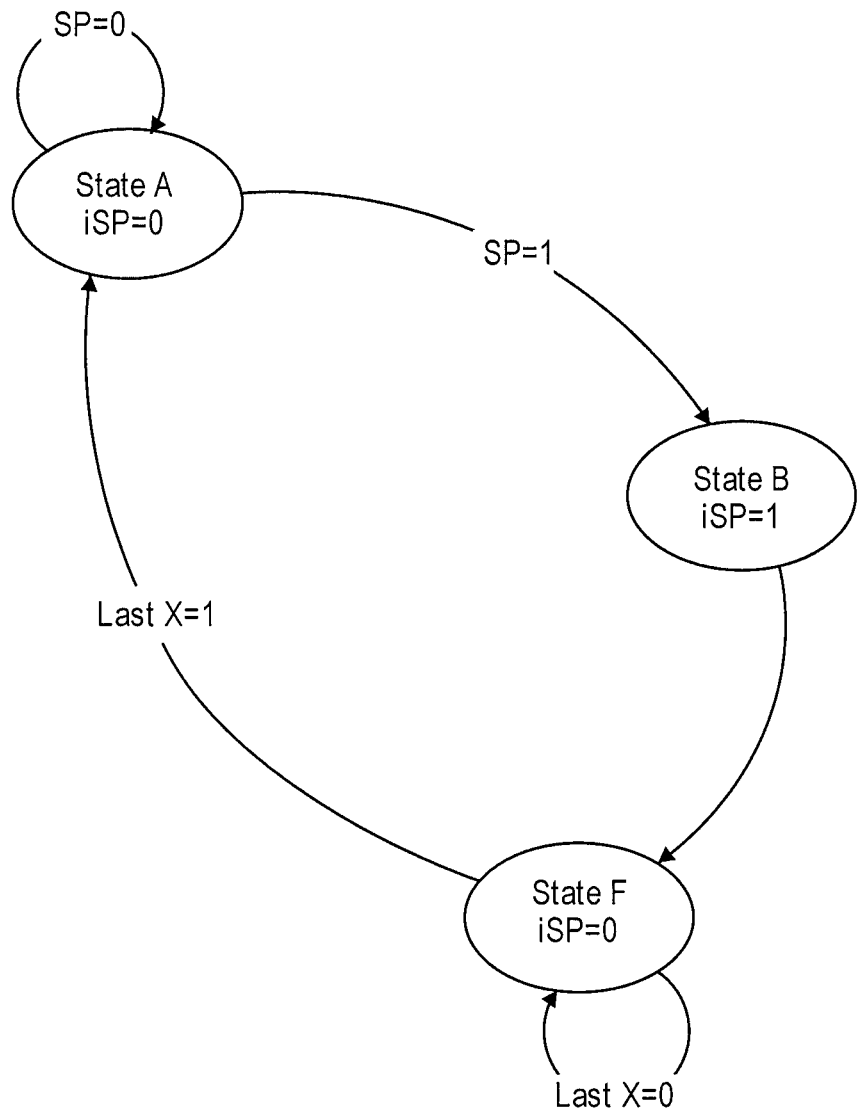
FIG. 3 is a block diagram of an example state machine that controls the internal start pulse input.

In one embodiment, the state machine logic 13 contains a state machine that is designed in accordance with the state diagram of FIG. 3. In that case, the state machine has at least states A, B and F, with the indicated output in each state being iSP, either asserted (1), or de-asserted (0). Upon initialization of the gate driver, including resetting of all of the shift register cells, the state machine begins operation in state A with the iSP=0 (de-asserted). The state machine then waits in state A (so long as the external start pulse, SP, is not asserted) until SP becomes asserted and the state machine transitions (here, in response to the same active edge of SP) to state B.

Once in state B, the output of the state machine changes in that iSP becomes asserted, and the state machine transitions to state F in accordance with the next cycle of the system clock at which point the iSP becomes deasserted (thereby completing a pulse to the input of the first cell of the shift register logic 10). In state F, the internal start pulse remains de-asserted, and the state machine remains in state F so long as the output signal of the last cell of the shift register logic 10 is de-asserted (LastX=0). The state machine transitions from state F back to state A in response to the output signal of the last cell being asserted. In state A, iSP remains de-asserted so long as SP=0, until SP becomes asserted (and the process repeats as above with a transition from state A to state B). In this manner, iSP can only be pulsed once an SP pulse has completed a cycle through the shift register logic 10, thereby preventing the situation where a spurious assertion of SP causes a new pulse to be propagated by the shift register logic 10 (simultaneously with a pending pulse). In other words, the pulsing of the iSP input to the first cell of the shift register logic 10 is prevented until the current or pending shift register cycle is complete. This effect is also apparent in the example timing diagram of FIG. 4 in which a system clock orchestrates the assertion of iSP and the propagation of a start pulse through the cells of the shift register logic 10 (depicting the output of the first cell as X[1] and the output of the last cell as LastX). Note how in this particular example, while the transition from state A to state B is triggered by the active edge of the sys clock while SP=1, the transition from iSP=0 to iSP=1 is also triggered by the active edge of the sys clock.

Figure 4:
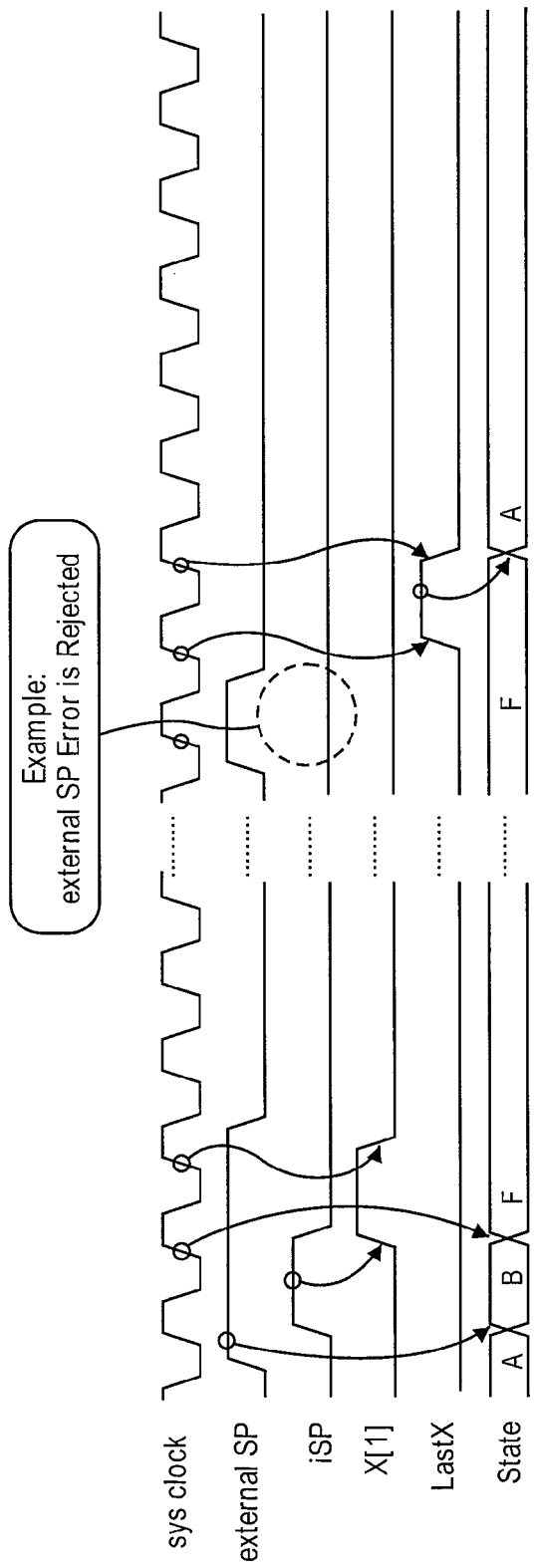
FIG. 4 is an example timing diagram that illustrates operation of the state machine.

FIG. 4 also shows how a spurious external SP (external SP error) is received, after the initial SP and before LastX output is asserted, but is rejected. The spurious SP is received before the gate driver shift register has completed a cycle based on an initial SP. The rejection is evidenced by the fact that the input of the first cell of the gate driver shift register (iSP) remains de-asserted until the cycle has completed, despite the spurious SP having been received.

Figure 5:
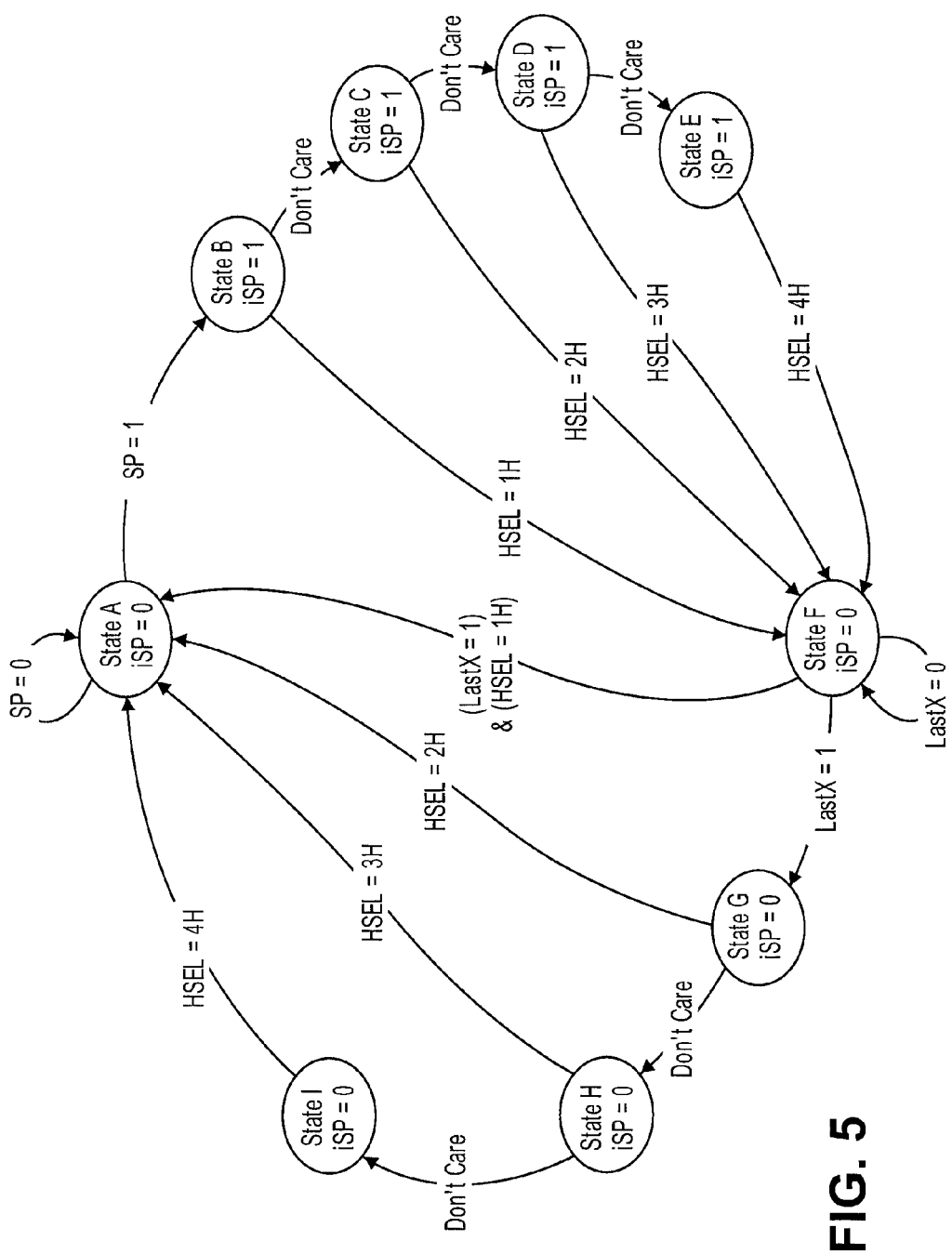
FIG. 5 is a state diagram of an example state machine that controls the internal start pulse input and that can be configured into different horizontal line modes.

The example state diagram depicted in FIG. 3 may be used to implement a 1-cycle horizontal line mode of operation, where as seen in FIG. 4 iSP is asserted for no more than one cycle of sys clock, meaning that only one row of the display panel is being updated at a time (by the gate driver). There are situations however when more than row of the display panel is to be updated simultaneously, by the gate driver. This is referred to as HSEL=2, or a horizontal line mode selection of two rows. FIG. 5 depicts a state diagram of a state machine that can control the internal start pulse input of the shift register logic 10 so as to yield different, horizontal line modes of operation for the display panel. When HSEL=1, the transition from state B to state F occurs in a single cycle of the system clock, as does the transition from state F to state A, such that only one shift register cell output is asserted at a time, for only one system clock cycle. The state machine in FIG. 5 extends this concept of controlling the internal SP input to longer horizontal line modes, where two or more (neighboring) shift register cells have their outputs asserted at any given cycle (equivalent to two or more adjacent bits propagating through the shift register).

For instance, when HSEL=4, the state machine is modified for operation in 4-cycle horizontal line mode (in which iSP=1 is retained for four consecutive cycles of the system clock). This may be achieved by adding states C, D and E (all of which retain iSP=1), and states G, H and I (all of which retain iSP=0). In that case, the state machine walks from state B to C, to D and then to E, before arriving at state F (in response to an additional 4 cycles of the system clock, as compared to the 1-cycle horizontal mode HSEL=1 depicted in FIG. 3). And, the state machines steps from state F to G, to H and then I, before arriving back at state A (in response to an additional 4 cycles of the system clock). The state machine may thus be made programmable to support several different horizontal line modes.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the state diagram of FIG. 3 calls for a state machine in which each state also has an output variable, being the internal start pulse signal (iSP), similar to a Moore machine, an alternative is to implement the state machine as a Mealy machine in which each state does not have a separate output variable. In that case, decoding logic may be added to the state machine logic 10 that decodes the current state into a value for iSP. The description is thus to be regarded as illustrative instead of limiting.

What is claimed is:

1. A gate driver circuit for a display panel, comprising:
a plurality of level shifting output stages to be coupled to drive a plurality of gate lines of a display panel;
shift register logic having a plurality of cells whose outputs are coupled to inputs of the level shifting output stages, respectively, the plurality of cells having a first cell and a last cell, wherein the shift register logic propagates an internal start pulse, received at an input of the first cell, to the last cell, in accordance with a system clock; and
state machine logic to produce the internal start pulse signal at the input of the first cell of the shift register logic, in response to a) an output signal of the last cell of the shift register logic and b) an external start pulse,
wherein the state machine logic comprises a state machine having first, second, and third states,
wherein in the first state the internal start pulse is de-asserted, and the state machine transitions to the second state in response to the external start pulse being asserted,
and wherein in the second state the internal start pulse is asserted, and the state machine transitions to the third state in accordance with the system clock,
and wherein in the third state the internal start pulse is de-asserted, and the state machine remains in the third state so long as the output signal of the last cell is de-asserted and then transitions to the first state in response to the output signal of the last cell being asserted.

2. The gate driver circuit of claim 1 wherein the first cell and the last cell are coupled to respective gate lines which are at a boundary or edge of the display panel.

3. The gate driver circuit of claim 1 wherein the state machine has a fourth state, the state machine in transitioning from first state to the third state does so through the fourth state in accordance with two cycles of the system clock and in response to a horizontal line mode selection that indicates two rows of the display panel are to be driven simultaneously by the gate driver.

4. The gate driver circuit of claim 3 wherein the state machine has a fifth state, the state machine in transitioning from the third state to the first state does so through the fifth state in response to the output signal of the last cell being asserted and in accordance with two cycles of the system clock, when the horizontal line mode selection indicates two rows of the display panel are to be driven simultaneously.

5. The gate driver circuit of claim 3 wherein the state machine has a sixth state, wherein the state machine in transitioning from the first state to the third state does so through the fourth state and then the sixth state, in accordance with three cycles of the system clock and in response to a horizontal line mode selection that indicates three rows of the display panel are to be driven simultaneously by the gate driver.

6. A method for operating a gate driver that is driving pixel transistors of a display panel, comprising:
receiving an external start pulse;
producing an internal start pulse responsive to the external start pulse and in accordance with a system clock, wherein the internal start pulse is input to a first cell of a gate driver shift register whose outputs are coupled to level shifting output stages that are driving a plurality of rows of pixel transistors of a display panel, and wherein the produced internal start pulse was qualified by an output of a last cell of the gate driver shift register;
transitioning a state machine from a first state to a second state responsive to the external start pulse being received, wherein the internal start pulse is asserted in the second state; and
transitioning from the second state to a third state responsive to the system clock, wherein the internal start pulse is de-asserted in the third state.

7. The method of claim 6 further comprising
receiving a spurious external start pulse after said external start pulse and before the gate driver shift register has completed a cycle based on said external start pulse, wherein the input of the first cell of the gate driver shift register remains de-asserted until the cycle has completed and despite the spurious external start pulse having been received.

8. The method of claim 6 further comprising transitioning the state machine from the third state to the first state responsive to the output of the last cell of the gate driver shift register.

9. A display system comprising:
an array of display elements;
a plurality of gate lines coupled to the display elements;
a plurality of switch elements each being coupled to a respective combination of display element and gate line;
a signal generator to produce an external start pulse, a system clock, and a plurality of clock signals; and
a gate driver coupled to drive the gate lines responsive to the clock signals, the gate driver having
a plurality of level shifting output stages coupled to drive the plurality of gate lines,
shift register logic having a plurality of cells whose outputs are coupled to inputs of the level shifting output stages, respectively, the plurality of cells having a first cell and a last cell, wherein the shift register logic propagates an internal start pulse, received at an input of the first cell, to the last cell, in accordance with the system clock, and
logic circuitry having an output that is coupled to the input of the first cell of the shift register logic, and an input that is coupled to receive the external start pulse, the logic circuitry to produce the internal start pulse at the input of the first cell of the shift register logic, in response to a) an output signal of the last cell of the shift register logic and b) an external start pulse at its input,
wherein the logic circuitry implements a state machine having first, second, and third states,
wherein in the first state the internal start pulse is de-asserted, and the state machine transitions to the second state in response to the external start pulse being asserted,
and wherein in the second state the internal start pulse is asserted, and the state machine transitions to the third state in accordance with the system clock,
and wherein in the third state the internal start pulse is de-asserted, and the state machine remains in the third state so long as the output signal of the last cell is de-asserted and then transitions to the first state in response to the output signal of the last cell being asserted.

10. The display system of claim 9 wherein the logic circuitry produces the internal start pulse from the external start pulse qualified by the output signal of the last cell of the gate driver shift register logic.

11. The display system of claim 9 wherein the display elements are LCD elements, and the switch elements are TFTs.

12. The display system of claim 9 wherein the first cell and the last cell are coupled to respective gate lines which are at a boundary or edge of a display panel.

13. The display system of claim 9 wherein the state machine has a fourth state, the state machine in transitioning from the first state to the third state does so through the fourth state in accordance with two cycles of the system clock and in response to a horizontal line mode selection that indicates two rows of a display panel are to be driven simultaneously by the gate driver.

14. The display system of claim 13 wherein the state machine has a fifth state, the state machine in transitioning from the third state to the first state does so through the fifth state in response to the output signal of the last cell being asserted and in accordance with two cycles of the system clock, when the horizontal line mode selection indicates two rows of the display panel are to be driven simultaneously.

15. The display system of claim 13 wherein the state machine has a sixth state, wherein the state machine in transitioning from the first state to the third state does so through the fourth state and then the sixth state, in accordance with three cycles of the system clock and in response to the horizontal line mode selection indicating three rows of the display panel are to be driven simultaneously by the gate driver.

* * * * *